(12) United States Patent
Pointer

(10) Patent No.: US 8,775,305 B2
(45) Date of Patent: Jul. 8, 2014

(54) CARD-PRESENT ON-LINE TRANSACTIONS

(75) Inventor: Barry Fitzpatrick Pointer, Lithonia, GA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 13/481,437

(22) Filed: May 25, 2012

(65) Prior Publication Data

US 2012/0317019 A1 Dec. 13, 2012

Related U.S. Application Data

(60) Provisional application No. 61/490,501, filed on May 26, 2011.

(51) Int. Cl.
*G06Q 40/00* (2012.01)
*G06Q 20/00* (2012.01)

(52) U.S. Cl.
CPC .............. *G06Q 40/00* (2013.01); *G06Q 20/00* (2013.01)
USPC .................. 705/39; 705/40; 705/64; 705/67; 705/76

(58) Field of Classification Search
None
See application file for complete search history.

(56) References Cited

U.S. PATENT DOCUMENTS

| | | | |
|---|---|---|---|
| 6,931,382 B2 * | 8/2005 | Laage et al. | 705/67 |
| 7,702,553 B1 * | 4/2010 | Dickelman | 705/35 |
| 7,702,577 B1 * | 4/2010 | Dickelman | 705/39 |
| 8,099,363 B1 * | 1/2012 | Kilchenstein, Jr. | 705/44 |
| 8,386,381 B1 * | 2/2013 | Barton et al. | 705/39 |
| 8,413,894 B2 * | 4/2013 | Bona et al. | 235/380 |
| 2001/0029485 A1 * | 10/2001 | Brody et al. | 705/39 |
| 2002/0091646 A1 * | 7/2002 | Lake et al. | 705/67 |
| 2002/0128977 A1 * | 9/2002 | Nambiar et al. | 705/64 |
| 2002/0133467 A1 * | 9/2002 | Hobson et al. | 705/64 |
| 2002/0156689 A1 * | 10/2002 | Spalding | 705/26 |
| 2003/0014360 A1 * | 1/2003 | Arditti et al. | 705/39 |
| 2003/0023549 A1 * | 1/2003 | Armes et al. | 705/40 |
| 2004/0030659 A1 * | 2/2004 | Gueh | 705/67 |
| 2004/0031856 A1 * | 2/2004 | Atsmon et al. | 235/492 |
| 2004/0155101 A1 * | 8/2004 | Royer et al. | 235/379 |
| 2004/0159700 A1 * | 8/2004 | Khan et al. | 235/380 |
| 2004/0172340 A1 * | 9/2004 | Bishop et al. | 705/26 |
| 2005/0221814 A1 * | 10/2005 | Fagan et al. | 455/422.1 |
| 2005/0269402 A1 * | 12/2005 | Spitzer et al. | 235/380 |
| 2005/0279827 A1 * | 12/2005 | Mascavage et al. | 235/380 |
| 2006/0000900 A1 * | 1/2006 | Fernandes et al. | 235/380 |
| 2006/0131410 A1 * | 6/2006 | Fernandes et al. | 235/449 |
| 2006/0206350 A1 * | 9/2006 | Edwards et al. | 705/1 |
| 2007/0063024 A1 * | 3/2007 | Guillot | 235/380 |
| 2007/0203732 A1 * | 8/2007 | Griegel et al. | 705/1 |
| 2008/0010217 A1 * | 1/2008 | Hobson et al. | 705/72 |
| 2008/0052183 A1 * | 2/2008 | Hobson et al. | 705/26 |
| 2008/0126252 A1 * | 5/2008 | Katz | 705/44 |
| 2008/0288404 A1 * | 11/2008 | Pirzadeh et al. | 705/44 |

(Continued)

*Primary Examiner* — Gregory Johnson
(74) *Attorney, Agent, or Firm* — Sutherland Asbill & Brennan LLP

(57) ABSTRACT

Embodiments of the invention can provide systems and methods for on-line credit card transactions. According to one example embodiment of the invention, a method can be provided. The method can include receiving, from a data manager, credit card information of a user; storing, on a secure element, the credit card information of the user; requesting a transaction with a merchant; receiving, from the merchant, a request for the credit card information; and sending, to the merchant, the credit card information of the user and a card-present indicator.

20 Claims, 3 Drawing Sheets

(56) References Cited

U.S. PATENT DOCUMENTS

| | | | |
|---|---|---|---|
| 2009/0006262 A1* | 1/2009 | Brown et al. | 705/64 |
| 2009/0099961 A1* | 4/2009 | Ogilvy | 705/39 |
| 2009/0108064 A1* | 4/2009 | Fernandes et al. | 235/380 |
| 2009/0132424 A1* | 5/2009 | Kendrick et al. | 705/75 |
| 2009/0157557 A1* | 6/2009 | Hobson et al. | 705/67 |
| 2009/0173784 A1* | 7/2009 | Yang | 235/380 |
| 2009/0248581 A1* | 10/2009 | Brown | 705/67 |
| 2010/0174649 A1* | 7/2010 | Bouchard | 705/44 |
| 2010/0274691 A1* | 10/2010 | Hammad et al. | 705/30 |
| 2010/0280950 A1* | 11/2010 | Faith et al. | 705/44 |
| 2010/0293094 A1* | 11/2010 | Kolkowitz et al. | 705/44 |
| 2011/0047072 A1* | 2/2011 | Ciurea | 705/39 |
| 2011/0047075 A1* | 2/2011 | Fourez | 705/44 |
| 2011/0087547 A1* | 4/2011 | Amaro et al. | 705/14.53 |
| 2011/0087596 A1* | 4/2011 | Dorsey | 705/44 |
| 2011/0101109 A1* | 5/2011 | Bona et al. | 235/492 |
| 2011/0231270 A1* | 9/2011 | Dykes et al. | 705/17 |
| 2011/0238575 A1* | 9/2011 | Nightengale et al. | 705/44 |
| 2011/0264567 A1* | 10/2011 | Clyne | 705/30 |
| 2011/0282789 A1* | 11/2011 | Carroll et al. | 705/44 |
| 2011/0288918 A1* | 11/2011 | Cervenka et al. | 705/14.17 |
| 2012/0022945 A1* | 1/2012 | Falkenborg et al. | 705/14.53 |
| 2012/0023022 A1* | 1/2012 | Carroll et al. | 705/44 |
| 2012/0095857 A1* | 4/2012 | McKelvey et al. | 705/17 |
| 2012/0097739 A1* | 4/2012 | Babu et al. | 235/380 |
| 2012/0109734 A1* | 5/2012 | Fordyce et al. | 705/14.25 |
| 2012/0130898 A1* | 5/2012 | Snyder et al. | 705/44 |
| 2012/0197802 A1* | 8/2012 | Smith et al. | 705/44 |
| 2012/0203698 A1* | 8/2012 | Duncan et al. | 705/44 |
| 2012/0215610 A1* | 8/2012 | Amaro et al. | 705/14.23 |
| 2012/0239479 A1* | 9/2012 | Amaro et al. | 705/14.23 |
| 2012/0239574 A1* | 9/2012 | Smith et al. | 705/44 |
| 2012/0296741 A1* | 11/2012 | Dykes | 705/14.53 |
| 2012/0296824 A1* | 11/2012 | Rosano | 705/44 |
| 2012/0317019 A1* | 12/2012 | Carnes | 705/39 |

* cited by examiner

CARD-PRESENT ON-LINE TRANSACTIONS

RELATED APPLICATION

This application claims priority to U.S. Ser. No. 61/490,501, titled "Trusted Service Manager," filed on May 26, 2011, the contents of which are incorporated herein by reference.

FIELD OF THE INVENTION

Embodiments of the invention relate generally to on-line credit card transactions, and additionally to allowing card present rates.

BACKGROUND OF THE INVENTION

Mobile devices, such as cell phones, personal digital assistants (PDAs), smart phones, and other similar devices, have increasingly been utilized to provide voice communications as well as additional functionality. With the ever expanding network of cellular and other communications means, and the rapidly growing volume of additional mobile device functionalities, the importance and popularity of mobile devices has likely never been greater. Additionally, with the growing volume of e-commerce options, and the ability to make on-line credit card purchases, users are turning more and more to Internet shopping. In some cases, mobile wallet applications enable mobile devices to interact with back-end service providers to facilitate Internet shopping. However, most back-end service providers are charged additional card-not-present fees for interacting with mobile wallet applications. Accordingly, improved systems and methods for on-line credit card purchases are desirable.

BRIEF DESCRIPTION OF THE INVENTION

Embodiments of the invention may provide systems and methods for providing online card-present transactions. According to one example embodiment of the invention, a method can be provided. The method can include receiving, from a data manager, credit card information of a user; storing, on a secure element, the credit card information of the user; requesting a transaction with a merchant; receiving, from the merchant, a request for the credit card information; and sending, to the merchant, the credit card information of the user and a card-present indicator. In certain embodiments, one or more operations can be performed by one or more computers associated with a service provider.

According to another embodiment, a system can be provided. The system may include at least one memory and at least one processor. The at least one memory may be configured to store computer-executable instructions. The at least one processor may be configured to receive, from a data manager, credit card information of a user; store, on a secure element, the credit card information of the user; request a transaction with a merchant; receive, from the merchant, a request for the credit card information; and send, to the merchant, the credit card information of the user and a card-present indicator. In certain embodiments, one or more operations can be performed by one or more computers associated with a service provider.

According to yet another embodiment, a method can be provided. The method can include provisioning a device with credit card information of a user; receiving, from the device, a request for a transaction with a merchant; and sending a card-present indicator to the device. In certain embodiments, one or more operations can be performed by one or more computers associated with a service provider.

According to another embodiment, a system can be provided. The system may include at least one memory and at least one processor. The at least one memory may be configured to store computer-executable instructions. The at least one processor may be configured to provision a device with credit card information of a user; receive, from the device, a request for a transaction with a merchant; and send a card-present indicator to the device. In certain embodiments, one or more operations can be performed by one or more computers associated with a service provider.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements.

This disclosure describes, among other things, card-present on-line transactions. In particular, systems and methods are presented for provisioning devices and/or mobile applications with secure user payment tenders, such as credit card information, that may allow for card-present rates for merchants when the devices are utilized to complete transactions. In certain embodiments of the invention, a mobile Near Field Communication (NFC) device may include one or more secure elements (e.g., a smart card chip) for housing multiple applications issued to the device by one or more issuers. As desired, the user payment tenders may be housed within the secure elements.

A wide variety of applications may perform a wide variety of actions from the secure elements. Examples of suitable actions include, but are not limited to, loading and/or installing new applications, personalizing applications with consumer data (e.g., credit card information, debit card information, stored value card information, etc.), locking and/or unlocking applications, terminating applications, and/or deleting applications. Additionally, provisioning may be implemented to "register" the mobile device with a service provider or to "register" an application of the mobile device. In certain embodiments of the invention, applications may be loaded and/or installed and personalized using an over-the-air (OTA) provisioning process. In one example, credit card information may be securely provisioned to a secure element by a trusted service manager (TSM).

In certain embodiments, a device may be able to act as a physical credit card. In this way, a merchant may not be charged a card-not-present fee from a lender or guarantor of funds, such as a credit card company. In one non-limiting example, a TSM, or a service provider associated with the TSM, may guarantee to the lender that the credit card information is secure and valid. Additionally, the TSM may provide a card-present indicator to the device, to the lender (or guarantor), or both.

Embodiments of the invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
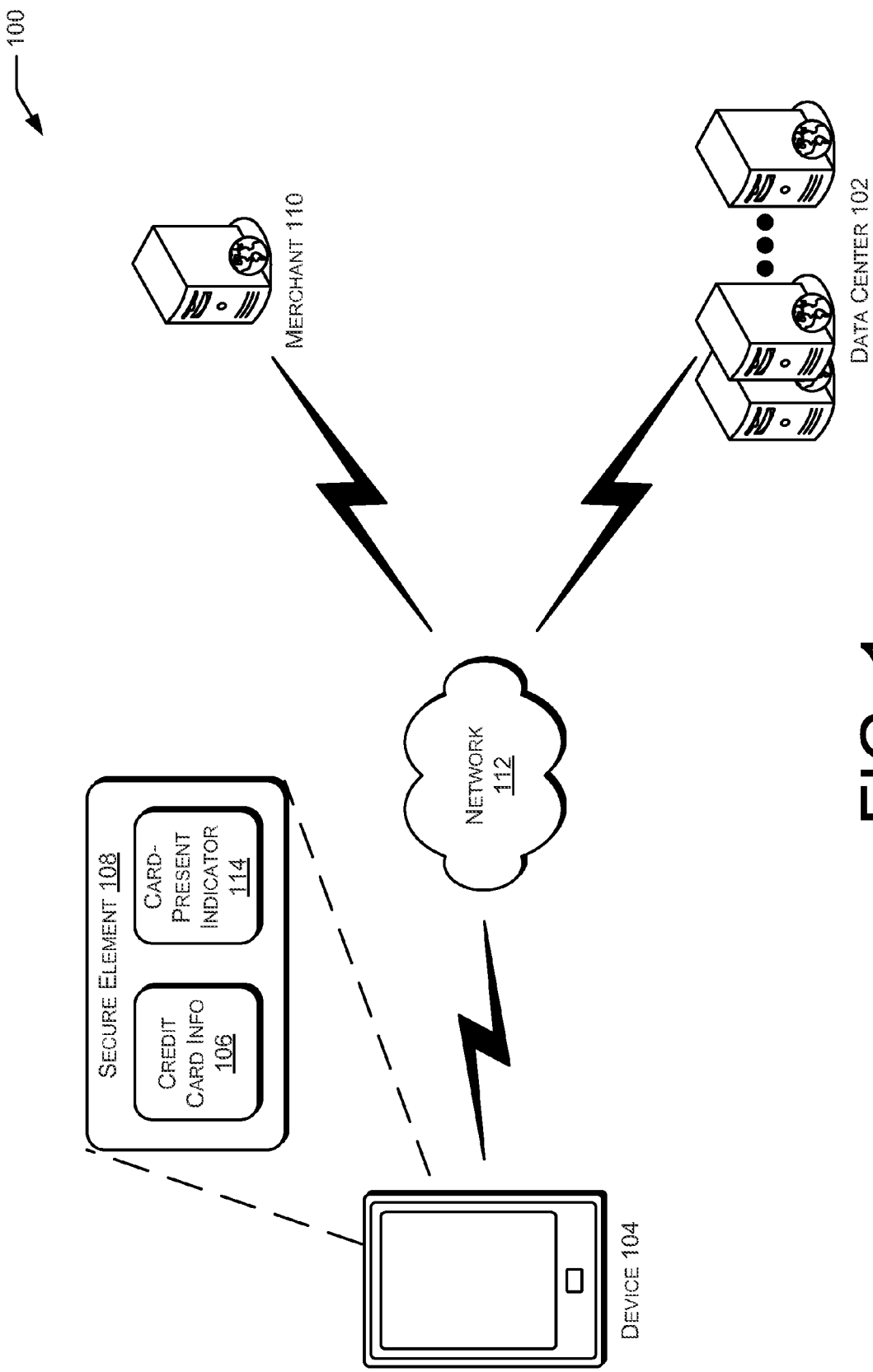
FIG. 1 illustrates a block diagram of an example card-present on-line transaction, according to an example embodiment of the invention.

FIG. 1 represents an illustrative block diagram illustrating a high-level overview of a card-present on-line transaction architecture 100. The architecture 100 includes a data center 102 which may be a TSM, a stand-alone device manufacturer, an application publisher or issuer, or any other entity for effectuating architecture 100. In certain aspects, a device 104 may be provisioned, by the data center 102, with credit card information of a user. For example, credit card information 106, including but not limited to account number, expiration date, account holder's name and address, etc., may be transmitted, or otherwise sent, to the mobile device 104 to be stored in a secure element.

In certain embodiments, the data center 102 may receive the credit card information 106 from the lender and may transmit this information to the device 104 for storage on a secure element 108. In some examples, the credit card information 106 may be transmitted in an encrypted form, transmitted unencrypted but then encrypted by the device 104, or both.

Alternatively, in certain embodiments, the data center 102 or the device 104 may receive the credit card information from the user of the credit card. In either case, the data center may authenticate this information prior to transmitting it to the device 104 and/or prior to transmitting it to a merchant.

In certain embodiments, a device 104 which may or may not already be provisioned with a user's credit card information may contact a merchant 110 via a network 112 with a request for an on-line transaction. However, in some embodiments, the transaction may not be on-line, while the payment may be on-line. As such, a user may utilize a mobile device 104 in place of a physical credit card in order to pay for a transaction at a retail store. Upon receiving the transaction request, the merchant 110 may request the credit card information 106 from the secure element 108. In one example, the device 104 may create a card-present indicator 114 for the particular transaction and transmit both the credit card information 106 and the card-present indicator 114 to the merchant 110. Alternatively, the data center 102 may be informed of the transaction and may provide the card-present indicator 114 to the device 104 prior to the device 104 transmitting the credit card information 106 and the card-present indicator 114. Either way, the merchant may then utilize this information to receive payment from a lender, such as the credit card company, without paying a card-not-present fee. In some instances, at least a portion of this savings, may be passed on to the data center 102 and/or the user of the device 104. Further, in some instances, the savings from avoiding the card-not-present fee may be used to encourage users to utilize applications of the data center 102 that provides certain embodiments of this invention.

FIG. 1 provides simplified examples of suitable card-present on-line transactions. However, other configurations are also possible. For example, while the devices 104 is shown as mobile device, the embodiments described above could also be used to allow on-line transactions without card-not-present fees for non-mobile devices, such as personal computers (PCs), tablet PCs, personal digital assistants (PDAs), smart televisions, and the like.

Figure 2:
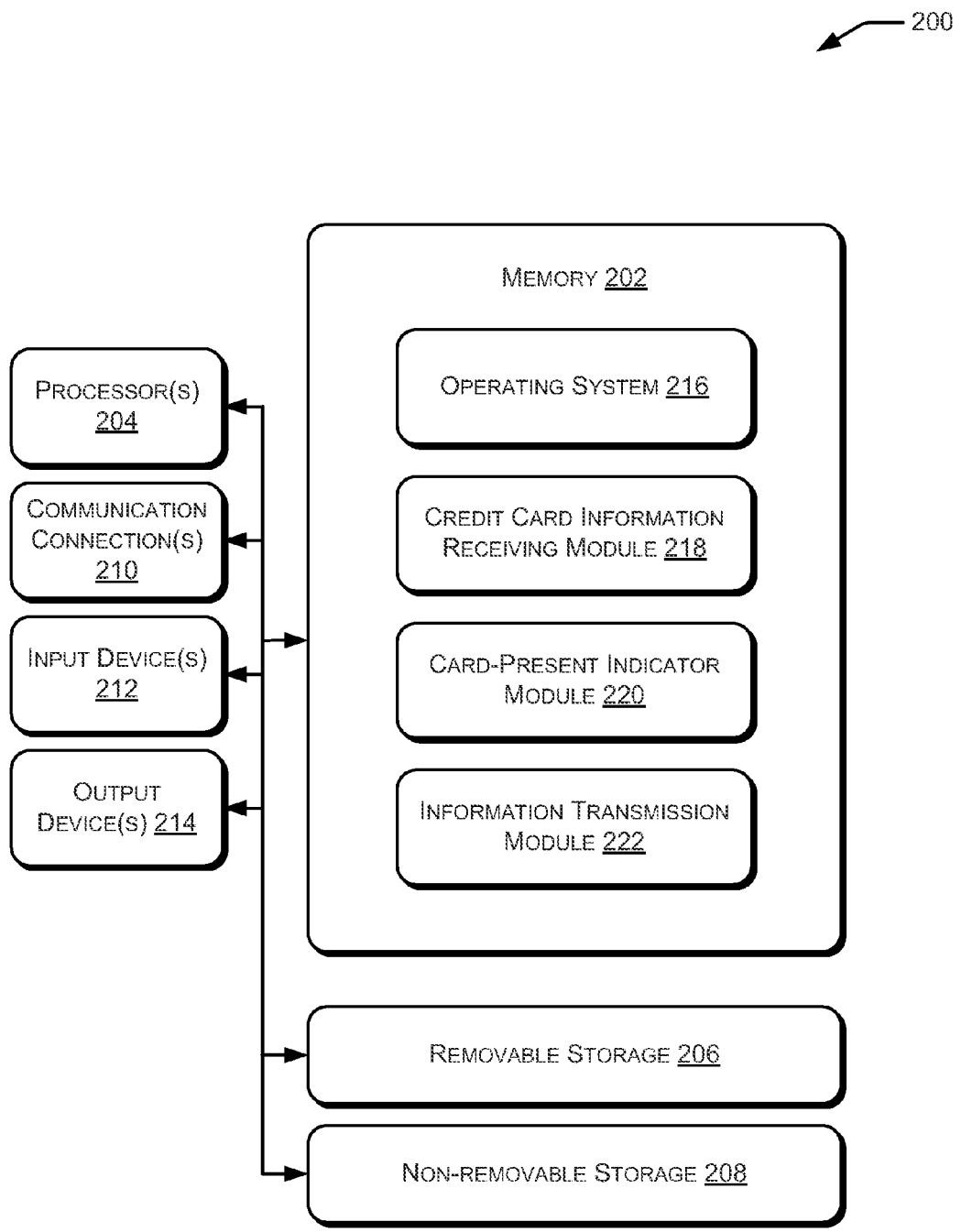
FIG. 2 illustrates a block diagram of an example computing device for implementing card-present on-line transactions, according to an example embodiment of the invention.

FIG. 2 provides an illustrative overview of one computing environment 200, in which aspects of the invention may be implemented. The computing environment 200 may be configured as any suitable computing device capable of implementing card-present on-line transactions. By way of example and not limitation, suitable computing devices may include personal computers (PCs), servers, server farms, data centers, or any other device capable of storing and executing all or part of the invention.

In one illustrative configuration, the computing environment 200 comprises at least one or more memories 202 and one or more processing units (or processor(s)) 204. The processor(s) 204 may be implemented as appropriate in hardware, software, firmware, or combinations thereof. Software or firmware implementations of the processor 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing device, memory 202 may be volatile (such as random access memory (RAM)) and/or non-volatile (such as read-only memory (ROM), flash memory, etc.). The computing device or server 200 may also include additional removable storage 206 and/or non-removable storage 208 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing environment 200 may also contain communications connection(s) 210 that allow the computing environment 200 to communicate with a stored database, another computing device or server, user terminals, and/or other devices on a network, such as device 104 of FIG. 1.

The computing environment 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the card-present on-line transaction architecture 100.

The memory 202 may further include a credit card information receiving module 218. The credit card information receiving module 218 may include, but is not limited to, logic configured to receive credit card information from a data center, such as a TSM. In one example, a TSM or other data center may have the credit card information stored in memory or it may receive the credit card information from another computing device or the user. As mentioned above, in certain aspects, because a secured element was provisioned with secure credit card information from a TSM, a merchant using the credit card information may not be charged a card-not-present fee.

The memory 202 may further include a card-present indicator module 220. The card-present indicator module 220 may include, but is not limited to, logic configured to create or receive a card-present indicator. The card-present indicator may be sent with credit card information to a merchant so that the merchant can indicate that the credit card information came from a secure element. This way, there is less risk to the lender in trusting that the requested transaction is not fraudulent.

The memory 202 may also include an information transmission module 222. The information transmission module 222 may include, but is not limited to, logic configured to transmit credit card information and the card-present indicator. The credit card information and the card-present indicator may be sent together or separately.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing device 200 shown in FIGS. 1 and 2 are provided by way of example only. Numerous other operating environments, system architectures, and device configurations are possible. Accordingly, embodiments of the present disclosure should not be construed as being limited to any particular operating environment, system architecture, or device configuration.

Figure 3:
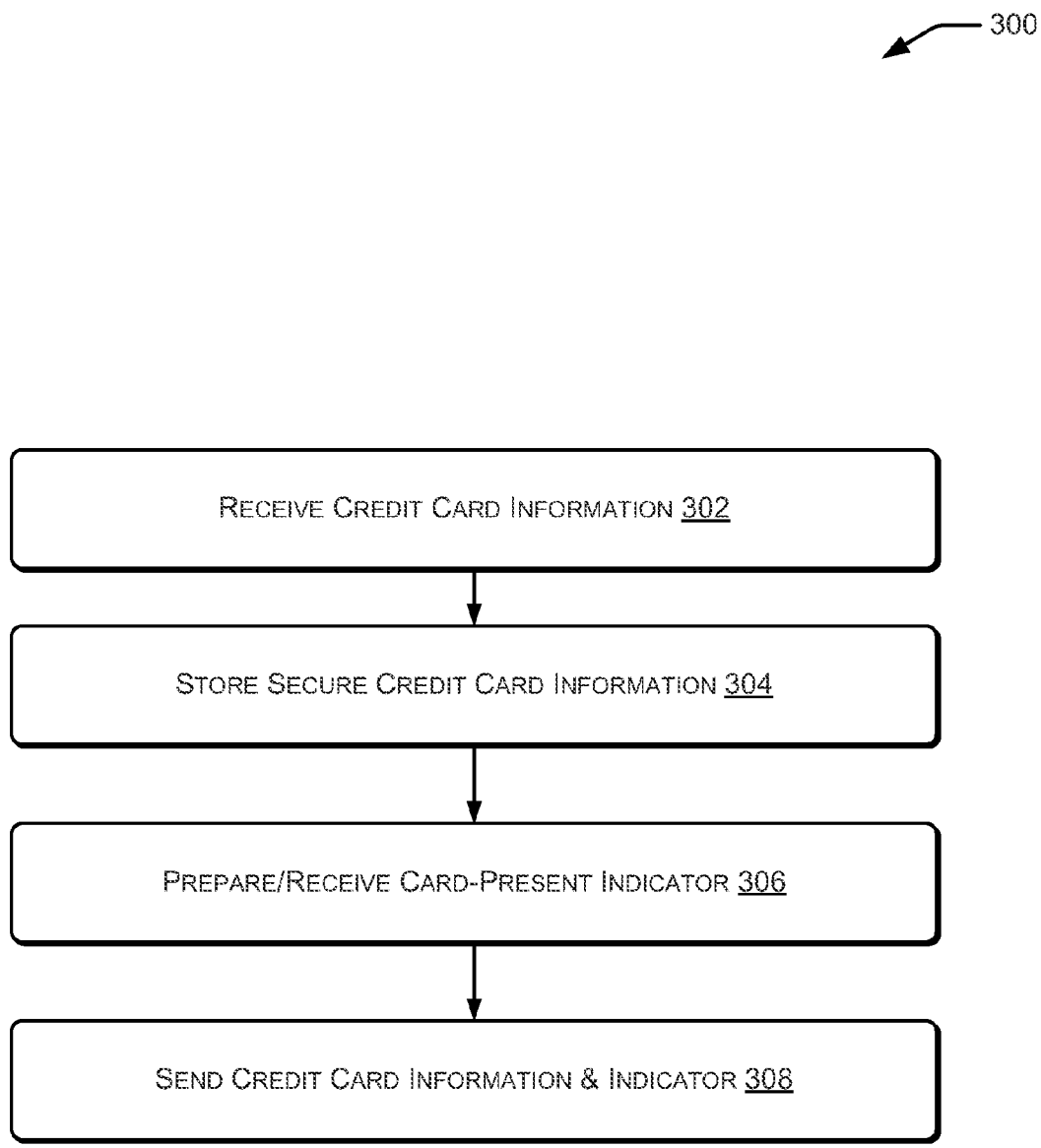
FIG. 3 illustrates a flowchart of an example process for implementing card-present on-line transactions, according to example embodiments of the invention.

FIG. 3 is a flow diagram of one illustrative method 300 of card-present on-line transactions, according to one embodiment. The method 300 may, but need not necessarily, be implemented using the architecture 100 shown in FIG. 1. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

By way of example only, the method 300 can be performed to facilitate the on-line transactions without incurring card-not-present fees, such as an application that facilitates transmitting credit card information and a card-present indicator. A mobile device user may request the installation of a desired application on an associated mobile device from either the TSM or directly from a service provider providing the NFC payment application. The TSM computer may perform the necessary steps to prepare the end user's mobile device and associated secure element, either directly and/or via the end user's mobile network operator. In addition, the TSM may perform the various authentication measures to verify the end user, the end user's mobile device, and set up and personalize the requested application for installation on the end user's secure element. After the requested application is personalized and authentication and security measures are in place at the TSM computer, the application may be provisioned to the end user's mobile device. After provisioning, the lifecycle of the application for that end user may be managed via the TSM computer. Various services can be provided and/or otherwise facilitated by the TSM computer, such as handling service requests from the end user and/or a service provider; facilitating updates to the application; and any other communications that may be requested between the service provider, the end user's mobile device, and/or the end user. It is appreciated that this description of provisioning, servicing an application, and facilitating on-line transactions is provided for illustrative purposes, and the methods described with reference to FIG. 3 may be performed for any type of mobile device application between any of a number of parties, and in any order.

The method 300 may begin at block 302 in which the method 300 may identify and/or receive credit card information associated a particular user. At block 304, the method 300 may store secure credit card information in the secure element of a computing device. The credit card information may be received via a secure channel, in a secured form, or otherwise. The method may then, at block 306, prepare and/or receive a card-present indicator that can be transmitted to a merchant with the credit card information. As noted above, the secure element, or an application of the computing device, may prepare or otherwise create a card-present indicator associated with a requested transaction. Alternatively, a card-present indicator may be prepared or otherwise created by a data center, such as a TSM, and sent to the secure element, or application of the computing device, to be sent with the credit card information. At block 308, the method 300 may send the credit card information and card-present indicator by transmitting the data over a network.

Various methods, techniques, or combinations of methods and/or techniques may be utilized to generate a card-present indicator. For example, in certain embodiments, the card-present indicator may be an eight or sixteen bit number associated with a particular transaction. In other aspects, however, the indicator may be a text string or other representation, the indicator may be encrypted, and/or the indicator may be randomly generated.

Although the invention has been described in language specific to structural features and/or methodological acts, it is to be understood that the invention is not limited to the specific features or acts described. Rather, the specific features and acts are disclosed as illustrative forms of implementing the invention.

The claimed invention is:

1. A method comprising:
   receiving, by a mobile device comprising one or more processors, from a data manager, credit card information of a user;
   storing, on a secure element in the mobile device, the credit card information of the user, wherein the secure element comprises a smart card chip;
   requesting, by the mobile device, a transaction with a merchant;
   receiving, from the merchant, a request for the credit card information;
   generating, by the mobile device in response to the request, a card-present indicator; and
   sending, to the merchant, the credit card information of the user and the card-present indicator.

2. The method of claim 1, wherein the credit card information is received from the data manager via secured provisioning.

3. The method of claim 1, wherein the credit card information is encrypted.

4. The method of claim 1, wherein the transaction comprises a request to purchase an item or a service.

5. The method of claim 1, wherein the card-present indicator is associated with the transaction.

6. The method of claim 5, wherein the merchant sends the credit card information and the card-present indicator to a lender for payment, and wherein the merchant is not charged a card-not-present fee based at least in part on the card-present indicator.

7. A method comprising:
   provisioning, by a computer comprising one or more processors, a device with credit card information of a user;
   receiving, by the computer from the device, a request for a transaction with a merchant;
   generating, by the computer in response to the request, a card-present indicator; and
   transmitting the card-present indicator to the device.

8. The method of claim 7, wherein the device is provisioned securely.

9. The method of claim 7, wherein the device is a mobile device, a smart phone, a personal digital assistant (PDA), a smart television, a personal computer (PC), or a tablet PC.

10. The method of claim 7, wherein the card-present indicator is associated with the transaction.

11. A system comprising:
    at least one memory configured to store computer-executable instructions; and
    at least one processor configured to access the at least one memory and execute the computer-executable instructions to:
      receive, from a data manager, credit card information of a user;
      store, on a secure element, the credit card information of the user, wherein the secure element comprises a smart card chip;
      request a transaction with a merchant;
      generate, in response to the request, a card-present indicator;
      receive, from the merchant, a request for the credit card information; and
      send, to the merchant, the credit card information of the user and the card-present indicator.

12. The system of claim 11, wherein the credit card information is received from the data manager via secured provisioning.

13. The system of claim 11, wherein the credit card information is encrypted.

14. The system of claim 11, wherein the transaction comprises a request to purchase an item or a service.

15. The system of claim 11, wherein the card-present indicator is associated with the transaction.

16. The system of claim 15, wherein the computer-executable instructions to send, to the merchant, the credit card information of the user and the card-present indicator comprises instructions to send the credit card information of the user and the card-present indicator to a lender for payment, and wherein the merchant is not charged a card-not-present fee based at least in part on the card-present indicator.

17. A system comprising:
    at least one memory configured to store computer-executable instructions; and
    at least one processor configured to access the at least one memory and execute the computer-executable instructions to:
      provision a device with credit card information of a user;
      receive, from the device, a request for a transaction with a merchant;
      generate, in response to the request, a card-present indicator; and
      transmit the card-present indicator to the device.

18. The system of claim 17, wherein the device is provisioned securely.

19. The system of claim 17, wherein the device is a mobile device, a smart phone, a personal digital assistant (PDA), a smart television, a personal computer (PC), or a tablet PC.

20. The system of claim 17, wherein the card-present indicator is associated with the transaction.

* * * * *